(12) United States Patent
Yoshizawa

(10) Patent No.: US 6,976,335 B1
(45) Date of Patent: Dec. 20, 2005

(54) BI-DIRECTIONALLY-CURVED VEHICLE WINDOW PANE AND VEHICLE DOOR STRUCTURE INCORPORATING THE SAME

(75) Inventor: Hideo Yoshizawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/048,130

(22) PCT Filed: Jun. 2, 2000

(86) PCT No.: PCT/JP00/03608

§ 371 (c)(1),
(2), (4) Date: May 9, 2002

(87) PCT Pub. No.: WO01/07250

PCT Pub. Date: Feb. 1, 2001

(30) Foreign Application Priority Data

Jul. 23, 1999 (JP) .................................. 11/209956

(51) Int. Cl.[7] .............................................. E06B 3/44
(52) U.S. Cl. ............................ 49/40; 49/374; 49/502
(58) Field of Search .......................... 49/40, 502, 374, 49/227

(56) References Cited

U.S. PATENT DOCUMENTS

| | | | | |
|---|---|---|---|---|
| 3,844,064 A | * | 10/1974 | Yamaha et al. | ................ 49/348 |
| 4,089,134 A | * | 5/1978 | Koike | .......................... 49/227 |
| 4,219,968 A | * | 9/1980 | Sakai et al. | ..................... 49/40 |
| 4,407,540 A | * | 10/1983 | Korff | ........................ 296/146.2 |
| 4,606,148 A | * | 8/1986 | Gandini | ........................ 49/502 |
| 4,648,205 A | * | 3/1987 | Ono | ............................. 49/374 |
| 4,697,386 A | * | 10/1987 | Watanabe et al. | .............. 49/374 |
| 4,783,930 A | * | 11/1988 | Tiesler | .......................... 49/374 |
| 4,819,380 A | * | 4/1989 | Trebbi | .......................... 49/374 |
| 4,927,207 A | * | 5/1990 | Kishino | ..................... 49/490.1 |
| 4,932,161 A | * | 6/1990 | Keys et al. | ................. 49/490.1 |
| 5,264,058 A | | 11/1993 | Hoagland et al. | |
| 5,443,669 A | | 8/1995 | Tunker | |
| 5,673,515 A | * | 10/1997 | Weber et al. | .................. 49/352 |
| 6,223,472 B1 | * | 5/2001 | Ishikawa et al. | .............. 49/502 |
| 6,449,907 B2 | * | 9/2002 | Nishikawa et al. | ........... 49/502 |

FOREIGN PATENT DOCUMENTS

| | | | |
|---|---|---|---|
| EP | 0 477 913 | * | 4/1992 |
| JP | 49-010331 | | 3/1974 |
| JP | 74010331 | * | 9/1974 |
| JP | 62-273115 | | 11/1987 |
| JP | 62273115 | * | 11/1987 |

(Continued)

*Primary Examiner*—Gregory J. Strimbu
(74) *Attorney, Agent, or Firm*—Hamre, Schumann, Mueller & Larson, P.C.

(57) ABSTRACT

Vehicle window pane (16) has an arcuately curved vertical section having a single or same radius of curvature (R1) and a curved lateral section having a single radius of curvature (R2) or a compound radius of curvature. The single radius of curvature (R1) in the curved vertical section and the single radius of curvature (R2) and the compound radius of curvature in the curved lateral section are chosen to differ from each other. The vehicle window pane (16) constitutes a bidirectionally curved pane, which is neither a spherically curved pane (because the radii of curvature in the vertical and lateral sections are not equal to each other) nor a cylindrically curved pane (because both of the radii of curvature in the vertical and lateral sections are not infinite). With this arrangement, the vehicle window pane can significantly improve an aesthetic appeal of a motor vehicle employing the window pane.

2 Claims, 15 Drawing Sheets

FOREIGN PATENT DOCUMENTS

| | | | |
|---|---|---|---|
| JP | 05-009037 | | 1/1993 |
| JP | 05009037 | * | 1/1993 |
| JP | 11-500796 | | 1/1999 |
| WO | 96-25580 | | 8/1996 |

* cited by examiner

BI-DIRECTIONALLY-CURVED VEHICLE WINDOW PANE AND VEHICLE DOOR STRUCTURE INCORPORATING THE SAME

TECHNICAL FILED

The present invention relates to a vehicle window pane having a novel curved shape with a characteristic combination of different radii of curvature, and a vehicle door structure incorporating such a window pane.

BACKGROUND ART

Various window panes for use in motor vehicles have been proposed to date, one example of which is disclosed, for example, in Japanese Patent Laid-Open Publication No. SHO-62-273115 entitled "APPARATUS FOR GUIDING ASCENDING/DESCENDING MOVEMENTS OF AUTOMOBILE WINDOW PANE". The window pane disclosed in this publication is a curved pane. Although not specifically stated in the publication, the disclosed window pane is arcuately curved so as to form part of a cylindrical surface with its portion parallel to a longitudinal axis of the motor vehicle running linearly or substantially linearly. Namely, the disclosed window pane, i.e., "cylindrically-curved window pane", has an arcuately-curved vertical section as viewed from the front of the motor vehicle and a near-linear horizontal or lateral section as viewed from above the motor vehicle. However, an overall aesthetic appeal of the motor vehicle would be significantly improved if the window pane is arcuately curved in the lateral section as well as in the vertical section.

Demand for an improved aesthetic appeal may be met by forming the window pane into a spherically curved shape; that is, the spherically curved shape provides an arcuately-curved lateral section as well as an arcuately-curved vertical section. Because of the nature of the spherically curved shape, each and every section taken through the window pane has one and the same radius of curvature. However, for almost every vehicle window pane used today, it is necessary that the vertical section be curved relatively greatly (with a relatively small radius of curvature) toward a roof of the motor vehicle and that the lateral section be slightly curved or be almost like a straight line. Therefore, the spherically-curved window pane, which has a uniform curvature in all directions thereof, particularly, in the directions parallel to and transverse to the longitudinal axis of the motor vehicle, can not readily be put into practical use.

Another type of curved vehicle window pane, analogous in shape to the above-mentioned spherically-curved vehicle window, is proposed, for example, in Japanese Patent Laid-Open Publication No. HEI-11-500796 (International Publication No. WO 96/25580) entitled "GUIDE FOR A LOWERABLE SPHERICALLY CURVED WINDOW PANE IN A VEHICLE DOOR". More specifically, the publication discloses a vehicle window pane that is curved to form part of an imaginary barrel-shaped envelope surface (hereinafter referred to simply as a "barrel-shaped window pane"), as shown in FIG. 23 hereof.

Specifically, part (a) of FIG. 23 is a side view of the barrel-shaped window pane disclosed in the Japanese Patent Laid-Open Publication No. HEI-11-500796, while part (b) of FIG. 23 shows vertical sections of the disclosed vehicle door window pane taken along lines 31—31, 32—32 and 33—33 of part (a). Because of the barrel shape, the vertical section taken along line 31—31, which is closest to the center of the pane, has a greatest radius of curvature. The vertical section taken along line 32—32, which is farther from the center of the pane than the line 31—31, has a smaller radius of curvature. The vertical section taken along line 33—33, which is still farther from the center of the pane than the line 31—31, has a yet smaller radius of curvature. That is, the farther from the center of the pane, the smaller becomes the radius of curvature of the vertical section. Namely, where the radius of curvature of the line 31—31 vertical section is given as "R31", the radius of curvature of the line 32—32 vertical section as "R32", R32<R31. Again, where the radius of curvature of the line 33—33 vertical section is given as "R33", R33<R32.

Such a barrel-shaped window pane, which progressively varies in the radius of curvature along the horizontal axis or X-axis as shown, would require a complicated shape in guide rails that serve to guide the window pane relative to the door body, as well as a complicated construction in the door body accommodating the window pane. As a consequence, the manufacturing costs of the guide rails and door body will increase, thereby presenting a bar to practical use of the barrel-shaped window pane.

The cylindrically-curved window pane, as typically disclosed in Japanese Patent Laid-Open Publication No. SHO-62-273115, has a drawback of insufficient aesthetic appeal, although it has been popularly used as a sliding vehicle window pane. The spherically-curved and barrel-shaped window panes, on the other hand, have the disadvantage that they are not suitable for practical use.

There has also been a demand for a glass sheet which has a compound curvature and is superior in aesthetic appeal to the above-described spherically-curved and barrel-shaped glass sheets.

An example technique to meet such a demand is disclosed in Japanese Patent Publication No. SHO-49-10331 entitled "METHOD FOR BENDING A GLASS SHEET". In this method, a glass sheet, held at a deformation temperature, is fed along an elongated path of travel on a gas support bed. The path of travel is bent both transversely and longitudinally in an up-and-down direction or vertically. As a result, the glass sheet is bent to have a compound curvature composed of curves extending both transversely and longitudinally of the sheet. Finally, the glass sheet is quenched to keep that compound curvature. However, in the disclosed technique, since the glass sheet is bent while it is floated by gaseous support means, it is quite difficult to provide the glass sheet with as many curves as desired, with precision. Stated otherwise, because it is bent while it is gas-supported, using a bed of a configuration copied from part of a rotary (e.g., a cylinder and a barrel) or a sphere, the glass sheet is provided with only curves of poor precision which extend transversely and longitudinally thereof at different radii of curvature.

Another similar technique is proposed in Japanese Patent Laid-Open Publication No. HEI-5-9037 entitled "METHOD AND APPARATUS FOR BENDING A GLASS SHEET". The proposed technique provides a glass sheet bent with a compound curvature. That is, the glass sheet is bent transversely and longitudinally at different radii of curvature while it is fed along a hearth bed. During feed of the glass sheet, a gas is blown from below the hearth bed to support the glass sheet in a floated fashion. Thus, the proposed technique can provide the glass sheet with only curves of poor precision extending transversely and longitudinally at two different radii of curvature.

DISCLOSURE OF THE INVENTION

It is accordingly an object of the present invention to provide a curved window pane which can be used suitably as a vehicle window pane with superior advantages over the known cylindrically-curved, spherically-curved and barrel-shaped window panes and glass sheets with curves of compound curvature, as well as a vehicle door structure incorporating such a curved window pane or glass sheet.

In order to accomplish the above-mentioned object, the present invention provides a vehicle window pane for slidable attachment to a motor vehicle, which is characterized in that the vehicle window pane has an arcuately curved vertical section having, at every position thereof, a same radius of curvature that corresponds to a radius of curvature of a predetermined sliding movement path followed by the vehicle window pane, and a curved lateral section having a same radius of curvature at every position thereof along the sliding movement path.

In the context of the present invention, the "vertical section" of the window pane refers to a section along a plane parallel to the predetermined sliding movement path while the "lateral section" of the window pane refers to a section along a plane intersecting the predetermined sliding movement path substantially at right angles thereto, irrespective of a posture in which the window pane is actually attached to a motor vehicle.

Namely, by forming an accurately curved vertical section and a curved lateral section, the vehicle window pane, as a whole, constitutes a bidirectionally curved pane, which is neither a spherically curved pane (because the radii of curvature in the vertical and lateral sections are not equal to each other) nor a cylindrically cured pane (because both of the radii of curvature in the vertical and lateral sections are not infinite). By thus choosing the vertical and lateral sectional shapes independently of each other. The inventive vehicle window pane can have and improved aesthetic appeal and the shape of the motor vehicle can be chosen freely as desired without being substantially bound by the window pane.

The radius of curvature in the curved vertical section and the radius of curvature in the curved lateral section are different from each other. By thus curving the window pane in both the vertical section and the lateral section with respective single radii of curvature, the facilities for manufacturing the inventive vehicle window pane can be simplified, thereby facilitating successive production of the window panes.

In one implementation of the present invention, the lateral section is curved with a compound curvature composed of a continuous sequence of a plurality of radii of curvature which are different from the radius of curvature in the curved vertical section. By thus curving the lateral section with the compound curvature, the freedom or flexibility in choosing the shape of the vehicle window pane, as well as the overall shape and design of the motor vehicle employing such a window pane, can be greatly increased.

According to another aspect of the present invention, there is provided a vehicle window pane for slideable attachment to a motor vehicle, characterized in that the window pane comprises a curved pane having a substantially uniform thickness with a principal surface thereof forming a curved surface, the curved surface being an aggregate of points satisfying the conditions:

(a) when a vector contacting the curved surface at a point on the curved surface is called a tangent vector, a tangent vector having a maximum curvature is called a first tangent vector, and a tangent vector having a minimum curvature is called a second tangent vector, all points on the curved surface have the first tangent vector and the second tangent vector 13 equipped with front and rear wheels 11 and 12; front door window panes 16 slidabley received in front slide doors 15 (only one of which is shown); rear door window panes 18 slidably received in rear side doors 17 (only one of which is shown); quarter window panes 19 (only one of which is shown) fixed to a part of the vehicle bodywork 13 rearwardly of the rear door window panes 18; a roof window pant 21 slidably received in a roof window 20 of the vehicle bodywork 13; and a rear window pant 23 (FIG. 2) fixed to a rear part of the vehicle bodywork 13. Of these window panes, each of the front and rear door window panes 16 and 18 and roof window pant 21 will hereinafter be sometimes called a "sliding vehicle window pane".

With this arrangement, it becomes possible to precisely define the shape of the inventive window pane (bidirectionally curved pane). The thus produced vehicle window pane permits narrowing of a pocket opening within a door body, whereby the door body 31 can be made slim.

The minimum curvature may be constant at all points on the curved surface.

Desirably, curvatures extending within an angular range defined by and between the first tangent vector and the second tangent vector are arranged to vary continuously from the maximum curvature to the minimum curvature.

According to a further aspect of the present invention, there is provided a vehicle door structure which comprises: the above-mentioned vehicle window pane; a door body having an attachment space for slidable attachment therein of the vehicle window pane and a pocket opening communicating with the attachment space for receiving the vehicle window pane for sliding movement in and out of the pocket opening with a substantially uniform clearance left between an outer peripheral surface of the vehicle window pane and an inner surface of the door body defining the pocket opening; a pair of guide rails formed in opposed inner surfaces of the door body and having a same radius of curvature as the predetermined sliding movement path of the vehicle window pane, so as to guide the sliding movement of the vehicle window pane in and out of the pocket opening relative to the door body; and a window regulator for sliding the vehicle window pane along the guide rails.

The pocket opening formed in the door body has a small cross-sectional area that is quite approximate to the lateral section of the vehicle window pane. The bidirectionally-curved window pane can be readily attached to the conventional door body for free ascending/descending movement with no interference by the inner surface of the door body. Thus, the inventive vehicle door structure can be completed with almost the same component parts as used in the conventional door structures, thereby avoiding an unwanted increase in the manufacturing costs.

BRIEF DESCRIPTION OF THE DRAWINGS

Certain preferred embodiments of the present invention will be described in greater detail below, by way of example only, with reference to the accompanying drawings, in which.

BEST MODE FOR CARRYING OUT THE INVENTION

Figure 1:
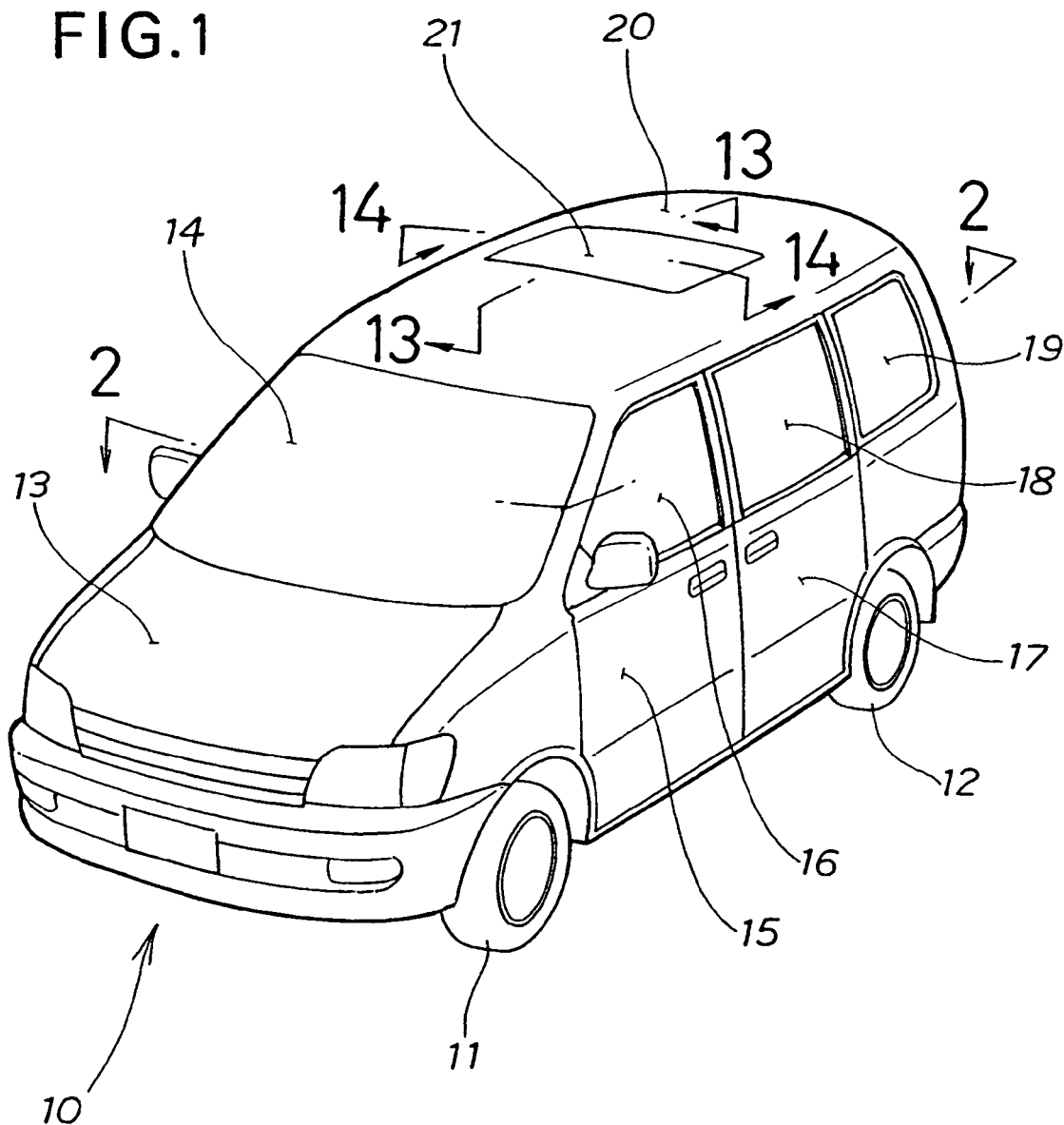
FIG. 1 is a perspective view schematically showing a general arrangement of a motor vehicle to which are applied the principles of the present invention.

Referring initially to FIG. 1, a motor vehicle 10 includes: a windshield 14 fixed to a forward part of a vehicle bodywork 13 equipped with front and rear wheels 11 and 12; front door window panes 16 slidably received in front side doors 15 (only one of which is shown); rear door window panes 18 slidably received in rear side doors 17 (only one of which is shown); quarter window panes 19 (only one of which is shown) fixed to a part of the vehicle bodywork 13 rearwardly of the rear door window panes 18; a roof window pane 21 slidably received in a roof window 20 of the vehicle bodywork 13; and a rear window pane 23 (FIG. 2) fixed to a rear part of the vehicle bodywork 13. Of these window panes, each of the front and rear door window panes 16 and 18 and roof window pane 21 will hereinafter be sometimes called a "sliding vehicle window pane".

Figure 2:
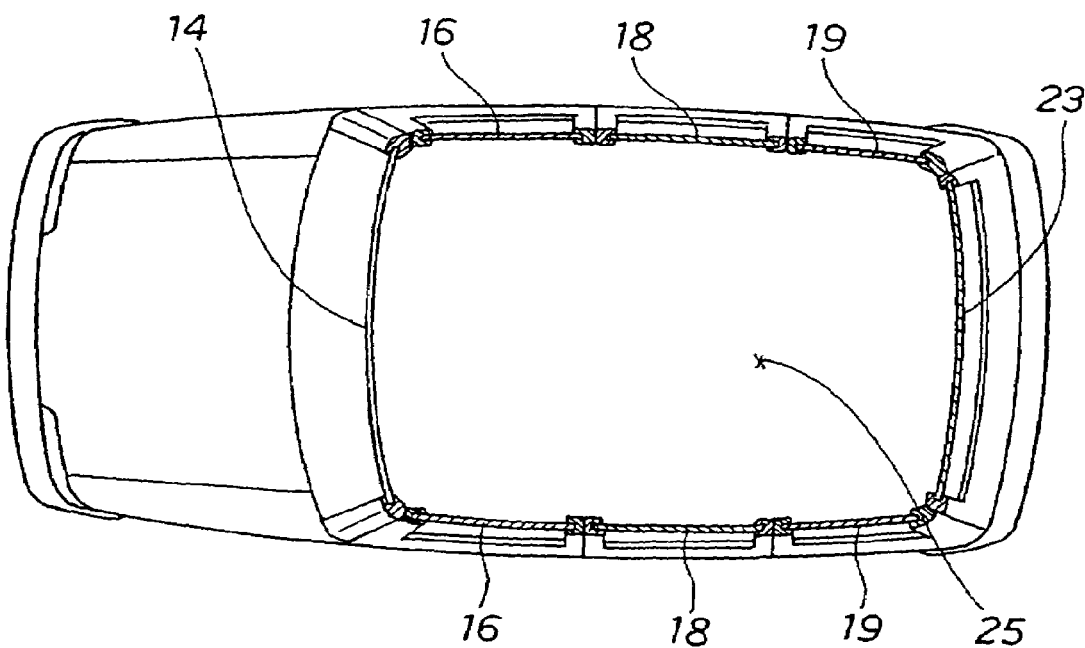
FIG. 2 is a cross-sectional view taken along line 2—2 of FIG. 1.

Reference is made next to FIG. 2 showing in particular a manner in which a vehicle compartment is enclosed by the windshield 14, front and rear door window panes 16 and 18, quarter window panes 19 and rear window pane 23. In the motor vehicle 10 as illustrated here, all of these window panes 14, 16, 18, 19 and 23 are arcuately curved so as to be convex outwardly or in an outboard direction.

So far, no problem has been encountered in curving the windshield 14, quarter window panes 19 and rear window pane 23 in three dimensions because they are "fixedly-fitted" panes. By contrast, it has been practically impossible to curve the sliding front ad rear door window panes 16 and 19 in the longitudinal direction of the vehicle bodywork 13 and yet permit upward/downward sliding movements of the thus-curved window panes 16 and 18. The present invention, however, is arranged to make it possible to curve the sliding front and rear window panes 16 and 18 in the longitudinal direction of the vehicle bodywork 13 in such a manner that the upward/downward sliding movements of the thus-curved panes along the respective door bodies are permitted without involving significant inconveniences. By curving the front and rear door window panes 16 and 18 and quarter window panes 19 with the same radius of curvature in the longitudinal direction of the vehicle bodywork 13, the present invention can markedly improve the outer appearance of these panes and hence the aesthetic appeal of the motor vehicle equipped with these panes.

Figure 3:
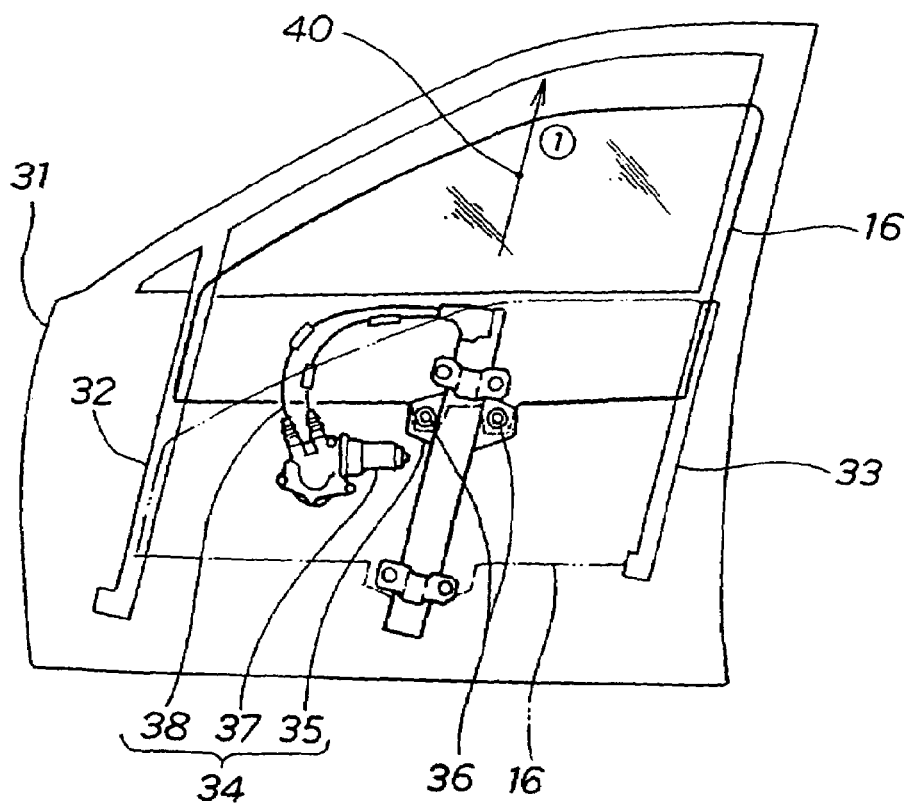
FIG. 3 is a schematic view illustrative of a vehicle door structure in accordance with an embodiment of the present invention.

As shown in FIG. 3, a vehicle door structure in accordance with a preferred embodiment of the present invention includes a door body 31 slidably receiving a door window pane (in this illustrated example, the front door window pane 16), a pair of opposed guide rails 32 and 33 for guiding the sliding upward/downward (i.e., ascending/descending) movements of the door window pane 16 relative to the door body 31. Also received in the door body 31 is a pane raising/lowering mechanism 34 commonly called a "window regulator". Raising/lowering coupler 35 of the window regulator 34 is secured to the door window pane 16 by means of bolts 36. Driving wire 38 is driven via an electric motor 37 so that the door window pane 16 is raised or lowered (moved upward or downward) by the wire 38 via the raising/lowering coupler 35 in a direction of arrow ①. Path of such movements, in the direction of arrow ①, of the door window pane 16 will hereinafter be referred to as a "pane sliding movement path" 40, for convenience of the following description. Note that arrow ①, and hence the pane sliding movement path 40, is arcuately curved in a direction normal to the plane of the sheet of FIG. 3.

Figure 4:
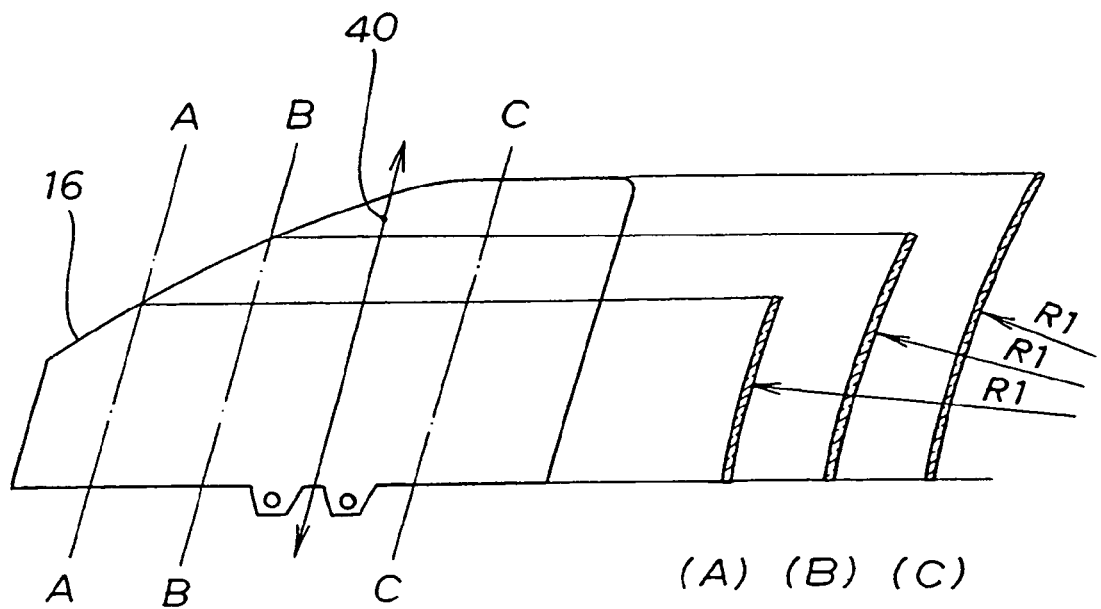
FIG. 4 is a view illustrative of a vehicle window pane in accordance with an embodiment of the present invention, which particularly shows vertical sections of the window pane.

Reference is now made to FIG. 4 illustrating the vehicle window pane. More specifically, part (A) of FIG. 4 shows a vertical section of the vehicle window pane (in this illustrated example, the front door window pane 16) taken along line A—A parallel to the pane sliding movement path 40. Similarly, part (B) and part (C) of FIG. 4 show other vertical sections of the vehicle window pane 16 taken along line B—B and line C—C, respectively, which are also parallel to the pane sliding movement path 40. All of these vertical sections of the vehicle window pane 16 have a same, first radius of curvature R1, and this first radius of curvature R1 equals that of the pane sliding movement path 40. Namely, the vertical section of the vehicle window pane 16 has the same first radius of curvature R1 at every position of the window pane 16 (in this case, throughout the length of the window pane 16). In the case where the window pane 16 is employed in a passenger vehicle, the first radius of curvature R1 is chosen to be in a range of 0.5 m–5 m.

In the case where the door window pane 16 as shown in FIG. 4 is employed in the vehicle door structure of FIG. 3, the guide rails 32 and 33 are also arcuately curved with the first radius of curvature R1 in the direction normal to the plane of the sheet of FIG. 3, so that the door window pane 16 is allowed to smoothly slide in the arrow ① direction, i.e., along the pane sliding movement path 40.

Figure 5:
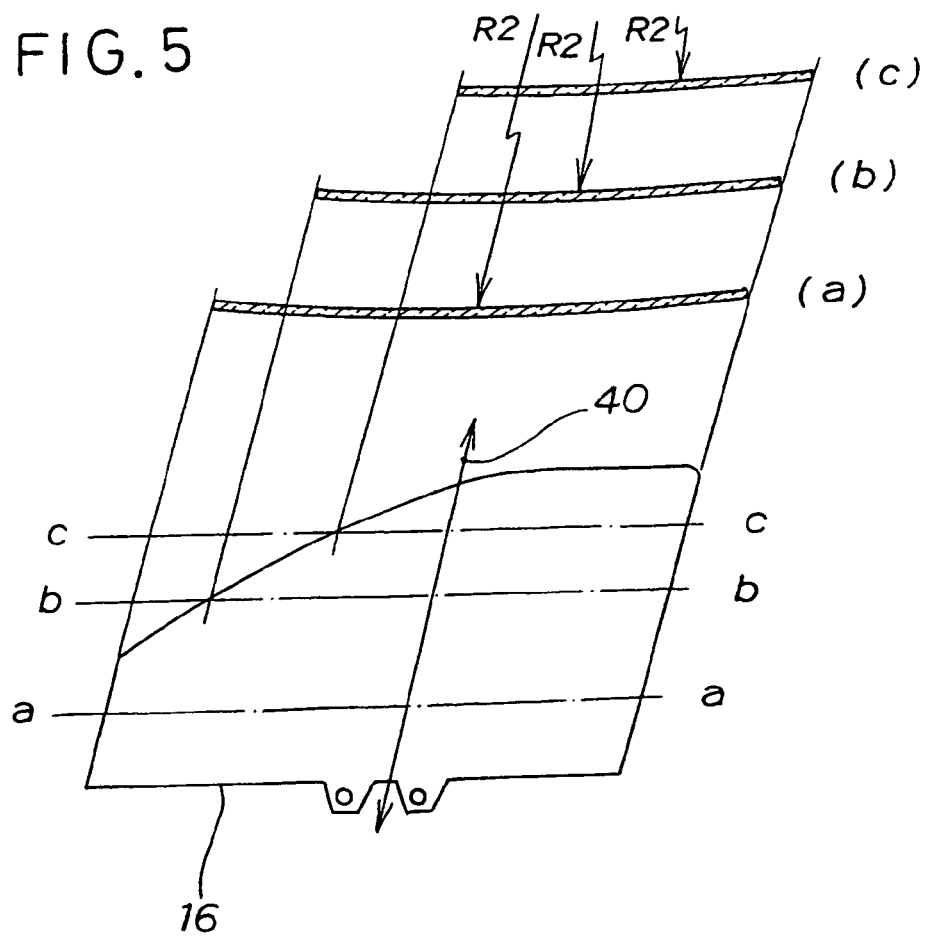
FIG. 5 is a view also illustrative of the vehicle window pane in accordance with the embodiment of the present invention, which particularly shows lateral sections of the window pane.

Turning now to FIG. 5, part (a) thereof 5 shows a cross or lateral section of the vehicle window pane (in this illustrated example, the front door window pane 16) taken along line a—a intersecting the pane sliding movement path 40 substantially at right angles thereto. Similarly, part (b) and part (c) of FIG. 5 show other lateral sections of the vehicle window pane 16 taken along line b—b and line c—c, respectively, which intersect the pane sliding movement path 40 substantially at right angles thereto. All of these lateral sections of the vehicle window pane 16 have a same, second radius of curvature R2 different from the above-mentioned first radius of curvature R1 (i.e., R2≠R1). Namely, the lateral section of the vehicle window pane 16 has the second radius of curvature R2 at every position of the window pane 16 (in this case, throughout the height of the window pane 16). In the case where the window pane 16 is employed in a passenger vehicle, the second radius of curvature R2 is chosen to be in a range of 5 m–50 m. The inventive vehicle window pane 16 thus shaped constitutes a bidirectionally curved pane, which is neither a spherically curved pane (because the second or lateral radius of curvature R2 is not equal to the first or vertical radius of curvature R1) nor a cylindrically curved pane (because R2≠∞ and R1≠∞) (either the vertical radius of curvature R1 or the lateral radius of curvature radius R2 is ∞ in the case of a cylindrically curved pane).

Figure 6:
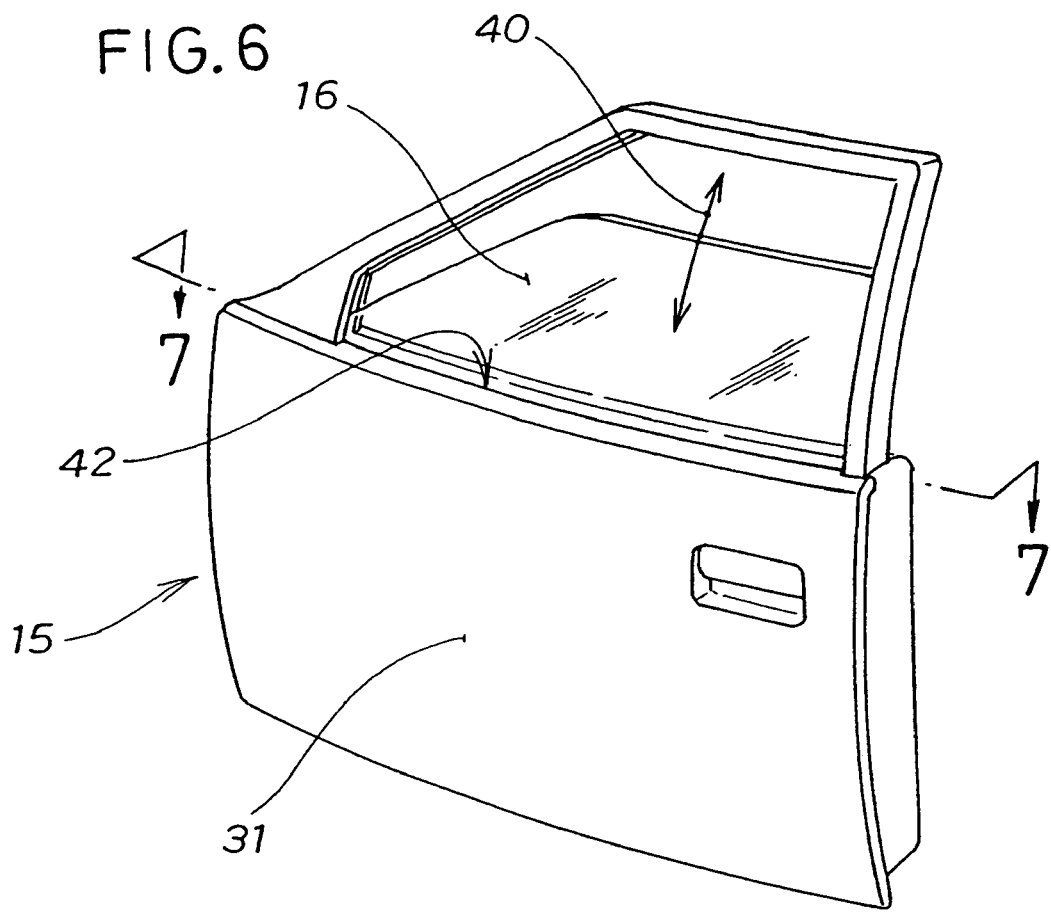
FIG. 6 is an enlarged perspective view of the vehicle door structure in accordance with the embodiment of the present invention.
Figure 7:
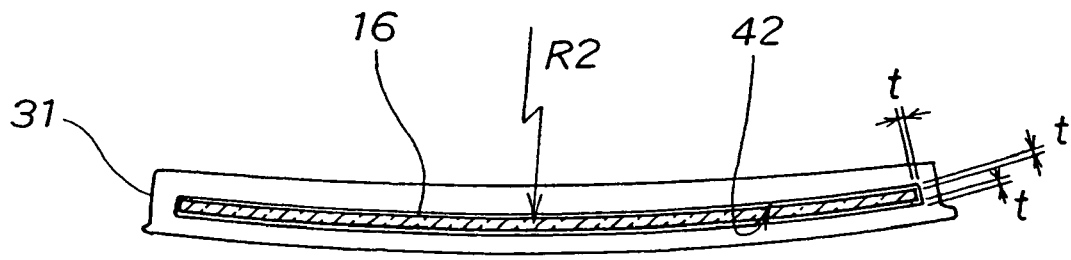
FIG. 7 is a cross-sectional view taken along line 7—7 of FIG. 6.

Reference is now made to FIG. 6 showing in perspective the vehicle door structure in accordance with the preferred embodiment, in conjunction with FIG. 7 which is a cross-sectional view taken along line 7—7 of FIG. 6. As shown in FIG. 7, the door body 31 has an pocket opening 42 in which the door window pane (in this illustrated example, the front door window pane 16) is fitted with an uniform clearance t left all around the pane 16 between the inner surface of the door body 31 and the outer surface of the pane 16. The pocket opening 42 communicates with a pane attachment space in the door body above the opening and may be formed in a slanted, flat surface.

Because the lateral section of the vehicle window pane 16 has the second radius of curvature R2, at every position of the window pane 16 (in this case, throughout the height of the pane 16) as described earlier in relation to FIG. 5, the window pane 16 always remains coincident in profile with the pocket opening 42 when it is being raised (pulled upward relative to the plane of the sheet of FIG. 7). Thus, the clearance t can be of a very small width or cross-sectional area. As a consequence, the bidirectionally-curved window pane 16 received in the door body 31 of FIG. 6 can be smoothly raised or lowered in the arrowed direction through the narrow pocket opening 42.

Figure 8A:
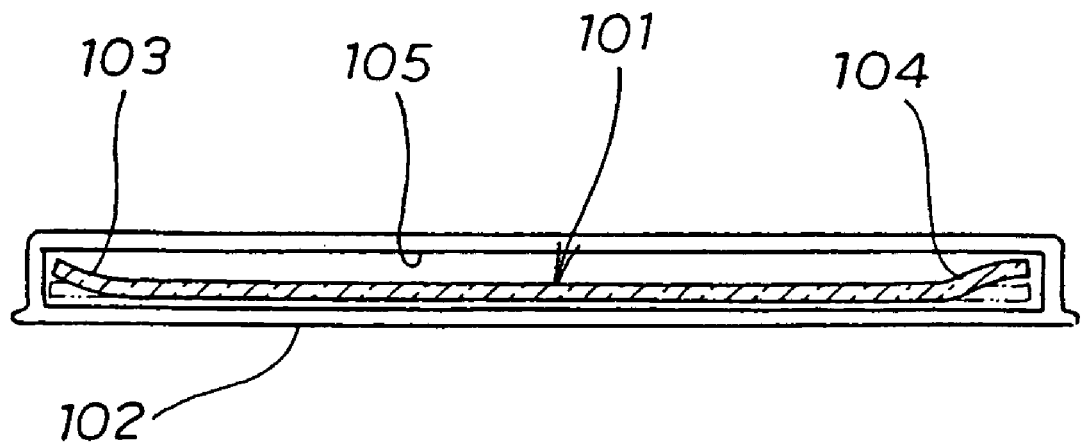
FIG. 8A is a sectional views showing a conventional motor vehicle pane.
Figure 8B:
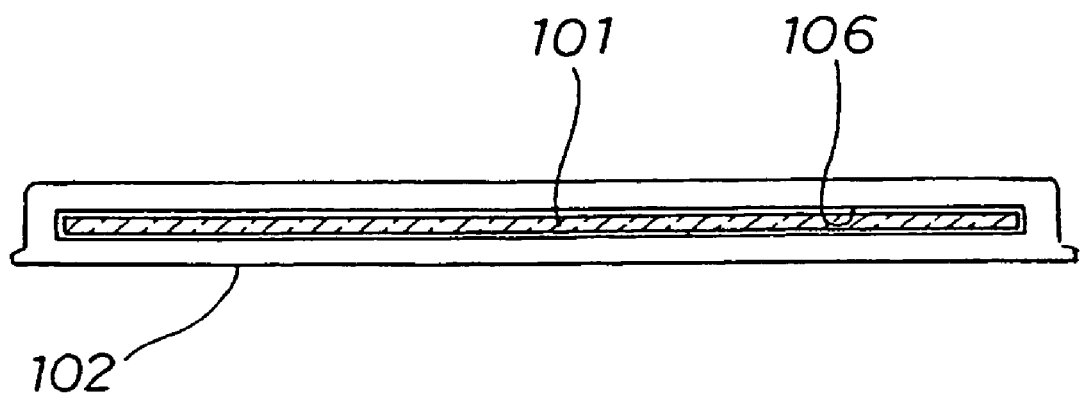
FIG. 8B is another sectional view showing a conventional motor vehicle pane.

FIGS. 8A and 8B are sectional views showing conventional motor vehicle panes in contradistinction to the above-described motor vehicle window pane of the present invention. More specifically, FIG. 8A illustrates a conventional motor vehicle window pane 101 of poor flatness received in a door body 102. Namely, distortion tends to occur in the conventional vehicle window pane 101 during preceding manufacturing stages; particularly, undesired warps 103 and 104 would persist in edges of the pane 101 as shown rather exaggeratedly in the figure. These warps tend to have random shapes beyond human control (i.e., uncontrollable as desired by a user), thereby creating various degrees of curvature in different portions of the manufactured pane. Such a vehicle window pane 101 would considerably wobble or shake in a direction across the thickness thereof, as denoted by phantom line in the figure, when it is being raised or lowered along the inner surface of the door body 102 surrounding the pane 101. To avoid the interference between the undesirably warped window pane 101 and the inner surface of the door body 102, it is necessary to form a sufficiently wide pocket opening 105 in the door body 102. However, the wider the pocket opening 105, the more difficult would become the weather-proofing work etc. of the door structure. Further, the wider pocket opening 105 leads to an increased overall thickness of the door body 102, which would greatly affect the design of the door structure.

More importantly, the random warps 103, 104 inherent in the window pane produced by the conventional method of production would raise serious optical problems. Namely, the random warps 103, 104 would present discontinuous optical characteristics, thereby refracting and distorting light and images transmitted through the window pane 101. Consequently, external views entering through the window pane 101 would look partly distorted to the eyes of a driver or passenger and the window pane 101 would look distorted to the eyes of people outside the motor vehicle such as passers-by. These are the major inconveniences presented by the conventional vehicle window pane 101 shown in FIG. 8A.

To provide solutions to those inconveniences, a more sophisticated conventional vehicle window pane 101 is formed into a straight cross-sectional shape with no curvature, so as to be received appropriately in a much narrower pocket opening 106 of the door body.

By contrast, the vehicle window pane 16 of the present invention has a continuous arc-curved shape as set forth above in relation to FIGS. 4 and 5 and thus presents no discontinuous optical characteristics that would result in an undesirable distortion of light and images.

Figure 9:
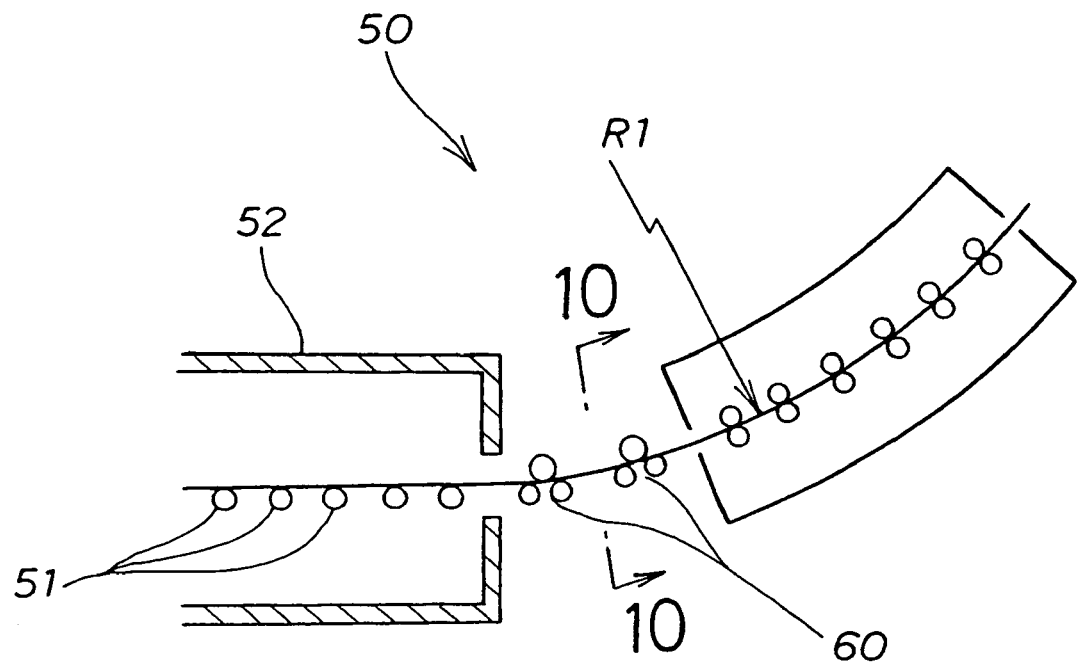
FIG. 9 is a diagram explanatory of basic principles on which the inventive vehicle window pane is manufactured.

FIG. 9 is a diagram explanatory of basic principles on which the vehicle window pane of the present invention is manufactured. Specifically, FIG. 9 shows an example of an apparatus for manufacturing the inventive bidirectionally-curved vehicle window pane which is neither spherically curved nor cylindrically curved. This manufacturing apparatus 50 includes a plurality of curving stations 60 following an exit of a glass-sheet heating furnace 52 provided with feed rollers 51. The curving stations 60, successively arranged in an arc having the radius of curvature R1, function to arcuately curve the heated glass sheet to be formed into the window pane 16, across the width thereof, into the first radius of curvature R1.

Figure 10:
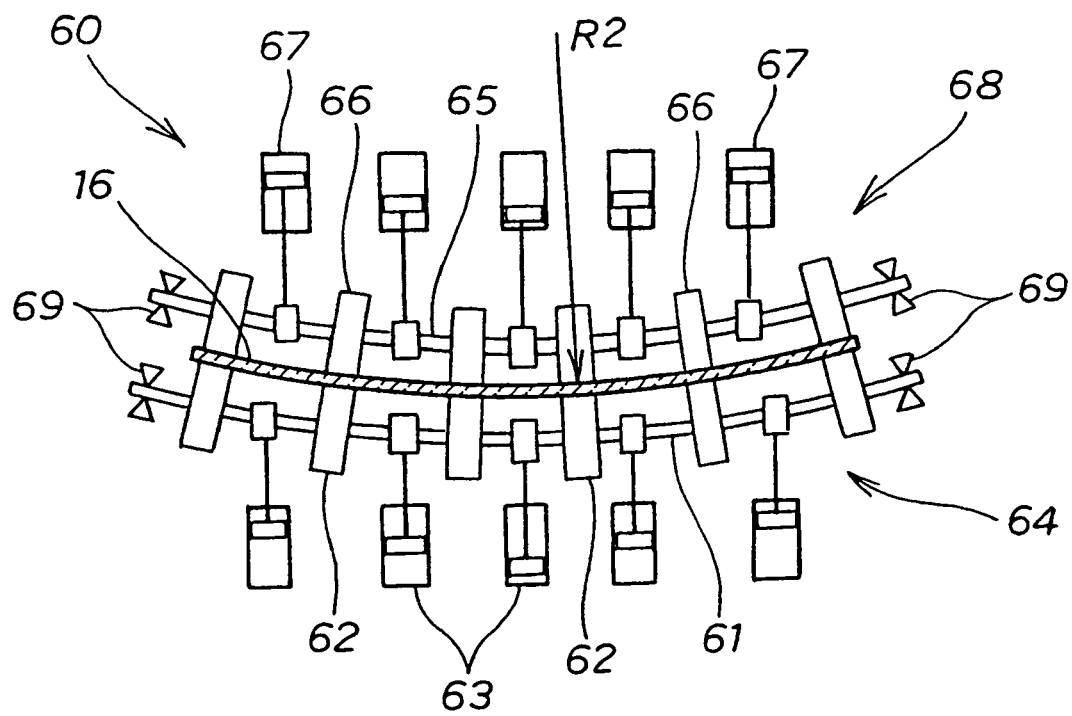
FIG. 10 is a view, partly in section, taken along line 10—10 of FIG. 9.

As shown in FIG. 10, each of the curving stations 60 includes a pair of lower and upper flexible shafts 61 and 65 over which are fitted two sets of disks 62 and 66, respectively. The curving station 60 also includes a lower rolling section 64 which compulsorily raises or lowers the lower flexible shaft 61 between the adjacent disks 62 by means of lower cylinders 63. The curving station 60 also includes an upper rolling section 68 which compulsorily raises or lowers the upper flexible shaft 65 between the adjacent disks 66 by means of upper cylinders 67. Bearings 69 are also provided at opposite ends of the two flexible shafts 61 and 65.

In each of the thus-constructed curving stations 60, the degree of curvature of the lower flexible shaft 61 can be adjusted, as desired by a user, by controllably operating the lower cylinders 63. By then curving the upper flexible shaft 65 in a similar manner to the lower flexible shaft 61, the glass sheet to be formed into the window pane (in this case, the front door window pane 16) can be arcuately curved into the second radius of curvature R2. Thus, the bidirectionally-curved vehicle window pane having the first and second radii of curvature R1 and R2 can be manufactured in the manner as described in relation to FIGS. 9 and 10.

Where the vehicle window pane is curved bidirectionally in such a way that its vertical section has the first radius of curvature R1 while its lateral section has the second radius of curvature R2, i.e., that not only its vertical section is arcuately curved with a single radius of curvature but also its lateral section is curved with another single radius of curvature, the manufacturing apparatus as shown in FIGS. 9 and 10 can be suitably used and readily provides for successive production of the inventive bidirectionally-curved vehicle window panes.

Figure 11A:
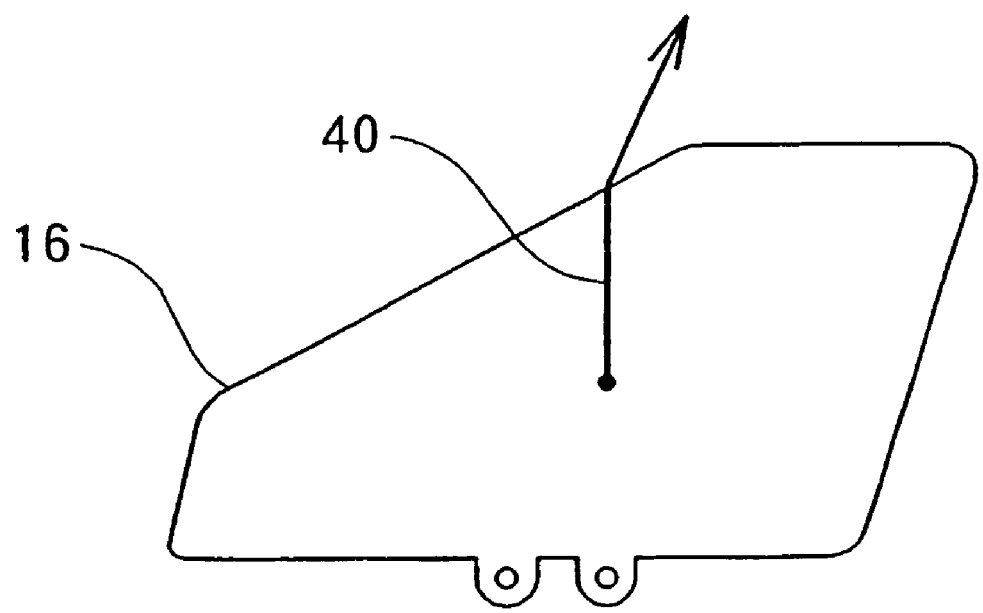
FIG. 11A is a diagram showing another examples of the pane sliding movement path followed by the window pane.
Figure 11B:
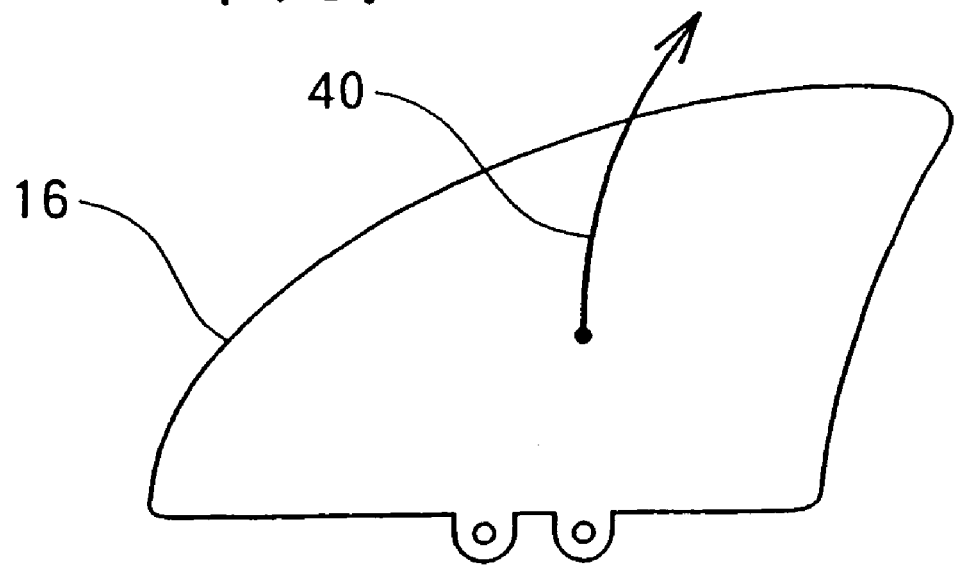
FIG. 11B is a diagram showing another example of the pane sliding movement path followed by the window pane.

Reference is made next to FIGS. 11A and 11B showing other examples of the pane sliding movement path 40 which the inventive bidirectionally-curved vehicle window pane can follow. The pane sliding movement path 40 shown in FIGS. 3 to 5 is linearly tilted relative to the vertical axis of the motor vehicle. However, according to the basic principles of the present invention, the pane sliding movement path 40 is not so limited and may be modified as shown in FIGS. 11A and 11B. Namely, FIG. 11A shows a modified pane sliding movement path 40 that is generally in the form of a broken-line or dogleg line, while FIG. 11B shows another modified pane sliding movement path 40 that is generally in the form of a circular arc.

Figure 12:
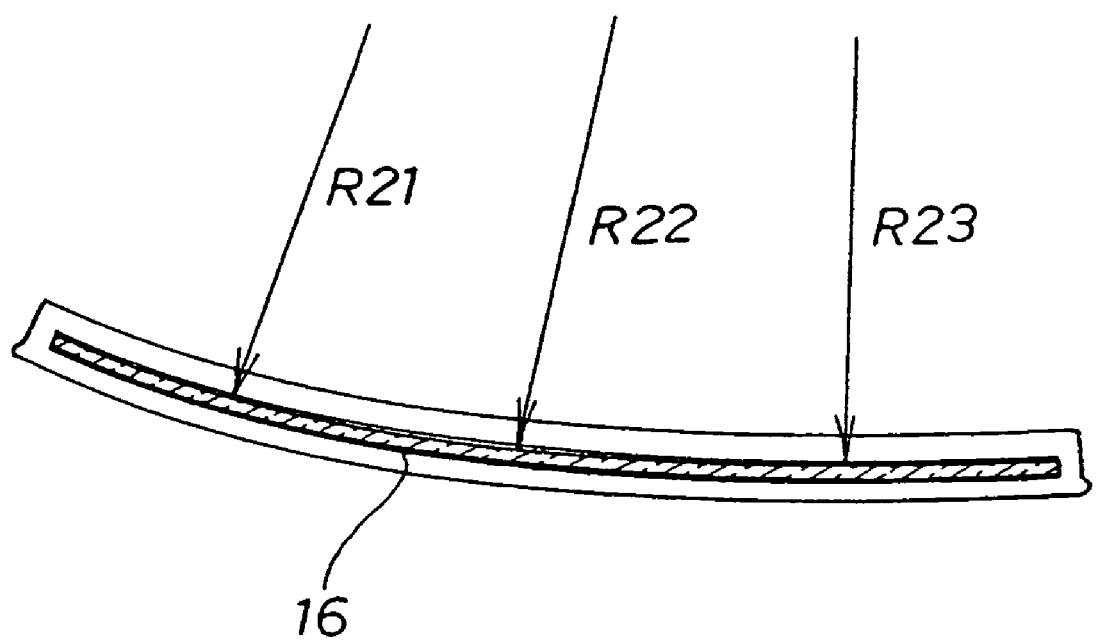
FIG. 12 is a cross-sectional view showing a modification of the vehicle window pane of FIG. 7.

Discussion will be made next as to a modification of the vehicle door structure of FIG. 7, with reference to FIG. 12. More specifically, shown in FIG. 12 is a modified vehicle window pane (in this case, the front door window pane 16) formed into a more complicated lateral section having a combination of radii of curvature R21, R22 and R23 (e.g., R21<R22<R23); such a combination of radii of curvature will be called a "compound curvature". Namely, the modified vehicle window pane 16 of FIG. 12 is characterized in that its vertical section has the single radius of curvature R1 while its lateral section has a compound curvature composed of a continuous sequence of a plurality of radii of curvature R21, R22, . . . , Rn ("n" is an integer greater than one, and R21≠R22≠R22≠, ≠R2n). By curving the lateral section with the compound curvature, the freedom or flexibility in choosing the shape of the vehicle window pane, as well as the overall shape and design of the motor vehicle employing such a window pane, can be greatly increased.

Figure 13:
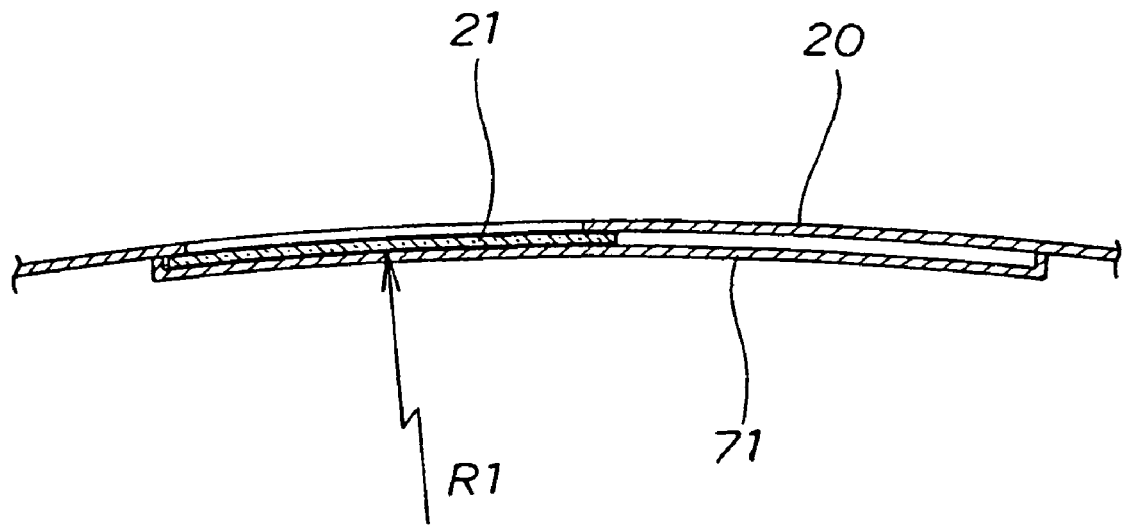
FIG. 13 is a vertical sectional view taken along line 13—13 of FIG. 1

As shown in FIG. 13, the roof window pane 21 is also arcuately curved with the first radius of curvature R1 in the longitudinal direction of the motor vehicle and is slidable rightward in the figure along rails (only one of which is shown) 71.

Figure 14:
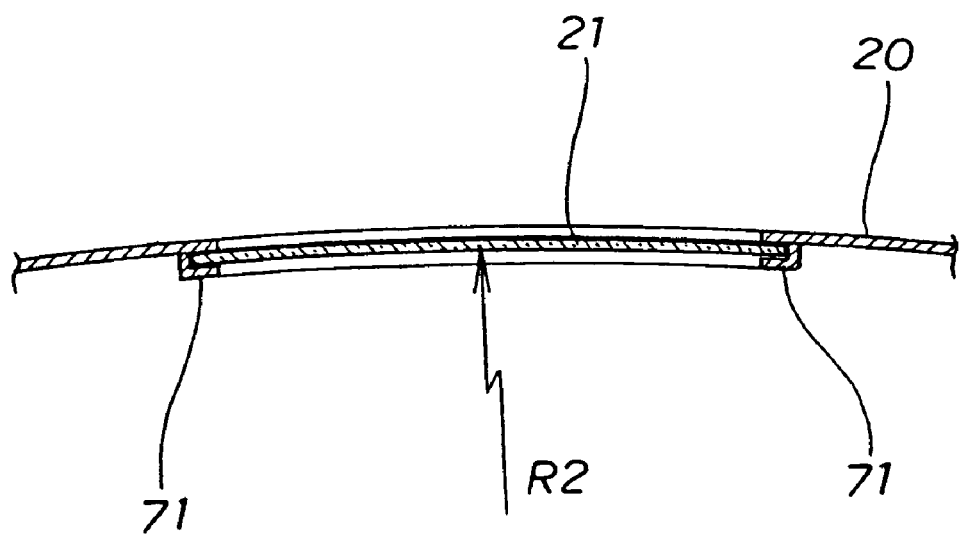
FIG. 14 is a vertical sectional view taken along line 14—14 of FIG. 1.

The roof window pane 21, as shown in FIG. 14, is also arcuately curved with the second radius of curvature R2 in the transverse or widthwise direction of the motor vehicle and is slidable in the direction normal to the plane of the sheet of the figure along rails 71. Namely, the roof window pane 21 as shown in FIGS. 13 and 14 is also a bidirectionally-curved vehicle window pane having an improved aesthetic appeal.

Figure 15:
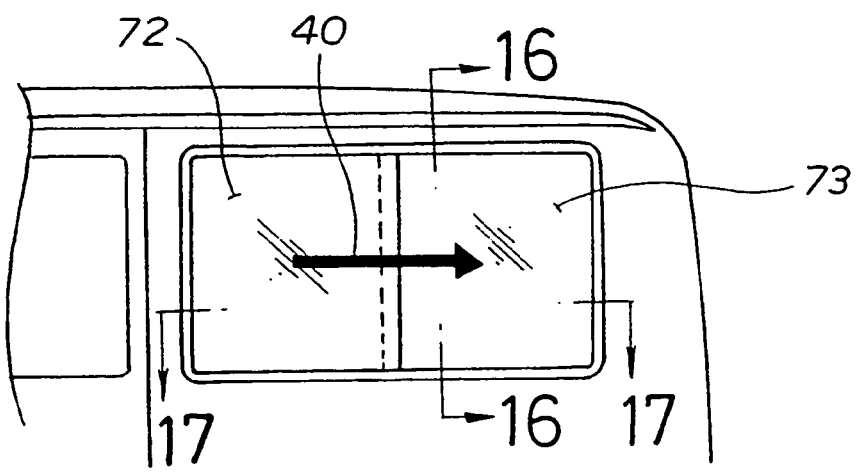
FIG. 15 is a view showing an example of a motor vehicle provided with two horizontally sliding window panes.

Shown in FIG. 15 is an example of a motor vehicle provided with two horizontally sliding window panes 72 and 73, at least one of which (e.g., pane 72) is horizontally slidable relative to the other along the horizontal pane sliding movement path 40 to close or open the window.

Figure 16:
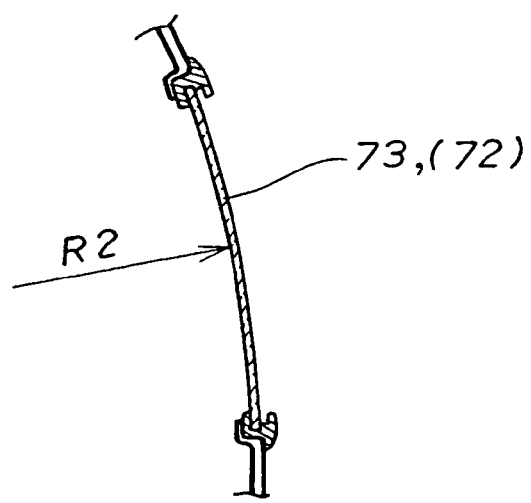
FIG. 16 is a vertical sectional view taken along line 16—16 of FIG. 15.

Turning now to FIG. 16, there is shown the vertical section of the window pane 73 as viewed in the direction perpendicular to the horizontal pane sliding movement path 40. The illustrated horizontally sliding window pane 73 has the radius of curvature R2, and if the other sliding window pane 72 also has the same radius of curvature R2, then the two window panes 72 and 73 are both allowed to slide in the direction normal to the plane of the sheet of the figure.

Figure 17:
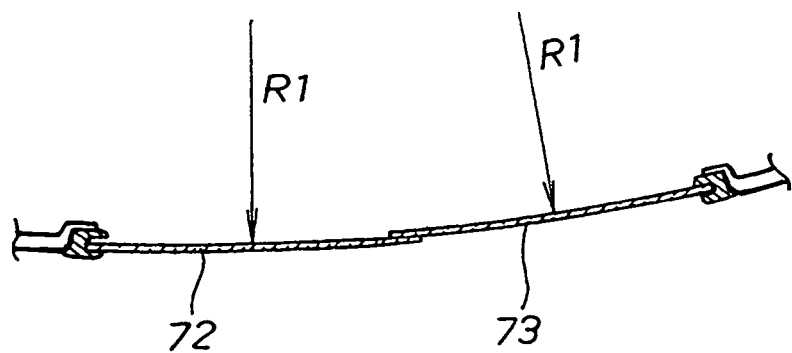
FIG. 17 is a vertical sectional view taken along line 17—17 of FIG. 15.

As shown in FIG. 17, both of the side horizontally sliding window panes 72 and 73 have the radius of curvature R1 in their lateral sections parallel to the horizontal pane sliding movement path 40.

The side horizontally sliding window panes 72 and 73 described above in relation to FIGS. 15 to 17 can be very useful when employed in a window structure to be built in a house or other building. Because these side horizontally sliding window panes 72 and 73 are each a bidirectionally-curved pane which has the first radius of curvature R1 in lateral section and the second radius of curvature R2 in vertical section and which is therefore neither a spherically curved pane nor a cylindrically curved pane, they are very preferable from the viewpoint of architectural aesthetics.

The present invention will now be described mathematically with reference to FIG. 18 to FIG. 22. The conventional window panes having a compound curvature are configured with poor precision. In contrast, the inventive window pane has a precisely-defined configuration. For precisely defining the configuration of a window pane, a mathematical or geometric approach should be taken.

Figure 18:
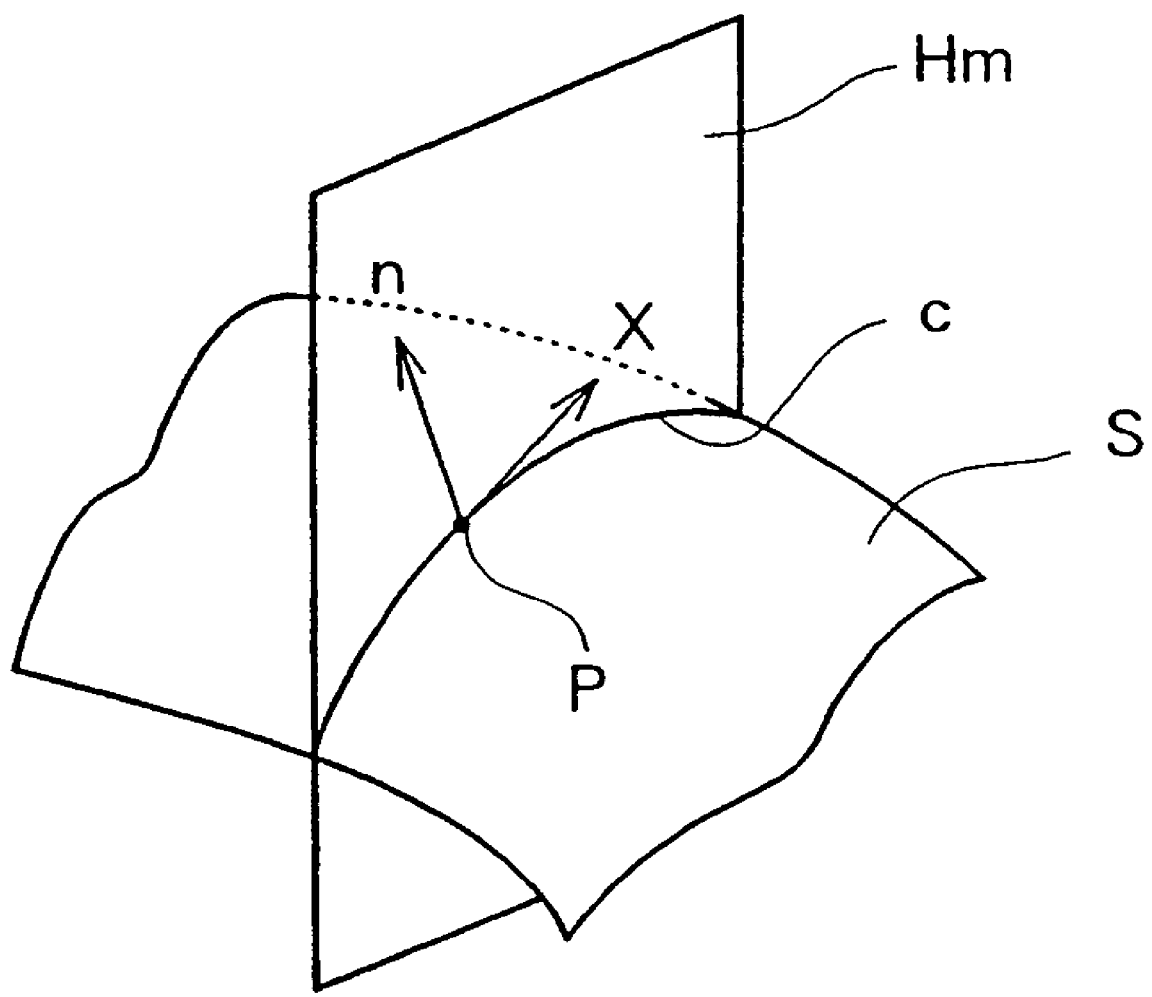
FIG. 18 is a view explanatory of the Euler's theorem.

Reference is now made to FIG. 18 explanatory of the Euler's theorem. Consideration is first given to a point P on a curved surface S shown in the Figure. Note that although the term "curved surface" just used should precisely be "surface" from a mathematical point of view, it is so used throughout this specification for the sake of distinction between that and other terms accompanied by "surface". Next, a unit normal vector n of the curved surface S at point P and a unit tangent vector X of the curved surface S at point P are given. The curved surface S is sectioned by a plane Hm including the vector X and vector n. A cut face or curve, arising in the plane Hm, of the curved surface S is referenced c. Curvature of the curve c at point P is represented by k. Particularly, the curvature in the direction of the unit tangent vector X is represented by kx. When unit tangent vectors X of the curved surface S at point P are given in various directions and where kx is not a constant, two unit tangent vectors $X_1$, $X_2$ arise with the following properties:

(1) $kx_1$ is a maximum value of kx while $kx_2$ is a minimum value of kx (2) $X_1$ and $X_2$ intersect with each other orthogonally (3) when an angle formed by X and $X_1$ is $\theta$, $kx = kx_1 \cos^2 \theta + kx_2 \sin^2 \theta$ This is what is called the Euler's theorem.

Figure 19A:
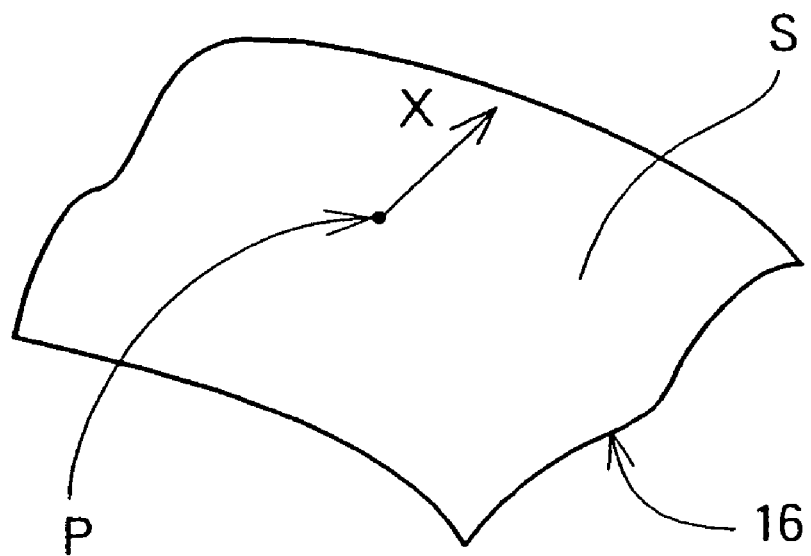
FIG. 19A is a view explanatory of a first phase of a mathematical approach employed in manufacturing the inventive window pane.
Figure 19B:
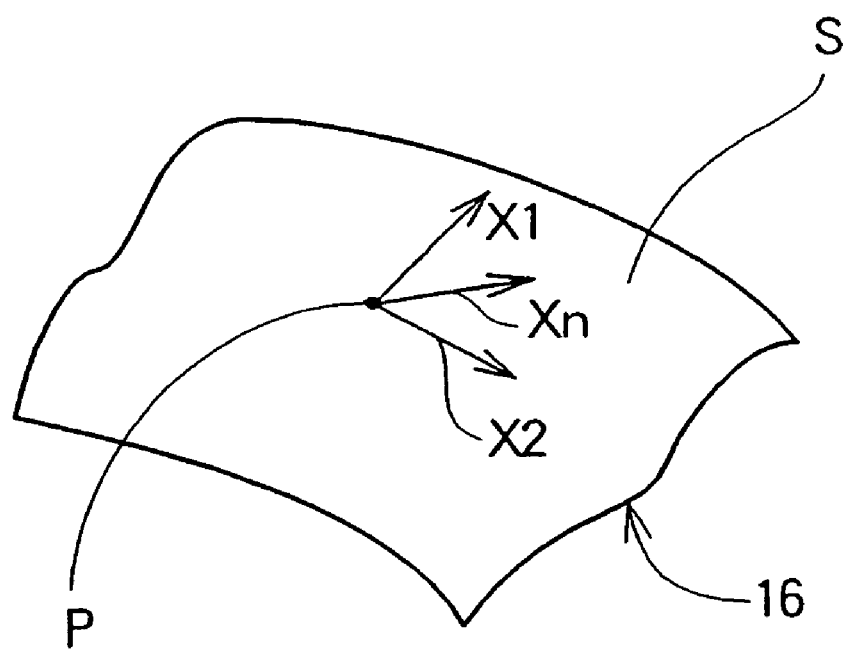
FIG. 19B is a view explanatory of a first phase of a mathematical approach employed in manufacturing the inventive window pane.

Reference is made next to FIGS. 19A and 19B which are explanatory of a first phase of a mathematical approach employed in manufacturing the inventive window pane. In FIG. 19A, designated by reference numeral 16 is a door window pane to be fitted in the vehicle door (see FIG. 1) vertically slidably. The window pane 16 is a curved pane having a substantially uniform thickness with a principal plane thereof forming the curved surface S. For attachment to the door body 31 or the guide rails 32, 33 (see FIG. 3), the door window pane 16 might be required to be altered in thickness at an edge thereof. The door window pane 16 with the edge thus altered in thickness is also deemed to be one of uniform thickness as far as a major part of the pane has a uniform thickness. Similarly, for attachment to the door body 31 or the guide rails 32, 33, the window pane 16 may require to be altered in shape at its edge, in which instance its principal surface may exclude the shape-altered edge.

Referring again to FIG. 19A, vector contacting the curved surface S at point P on the surface S is called a tangent vector X. As can be appreciated from FIG. 19B, there are an infinite number of tangent vectors X relative to the point P. These vectors can be expressed by Xn (n=1, 2, 3, . . . ). Of these vectors Xn, one having a maximum radius of curvature may be called a first tangent vector $X_1$ while another having a minimum radius of curvature may be called a second tangent vector $X_2$. In the door window pane 16, the first and second tangent vectors $X_1$, $X_2$ intersect with each other orthogonally.

Figure 20A:
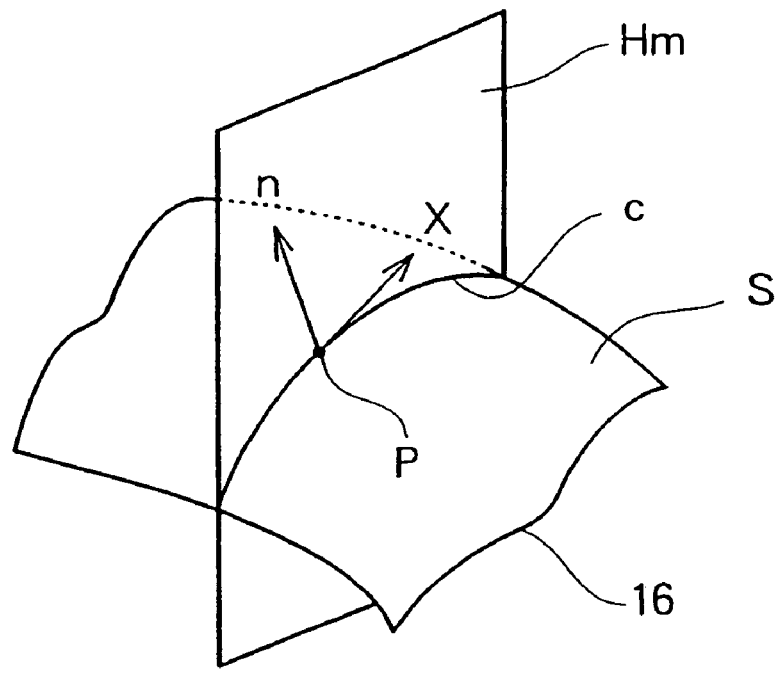
FIG. 20A is a view explanatory of a second phase of the mathematical approach.
Figure 20B:
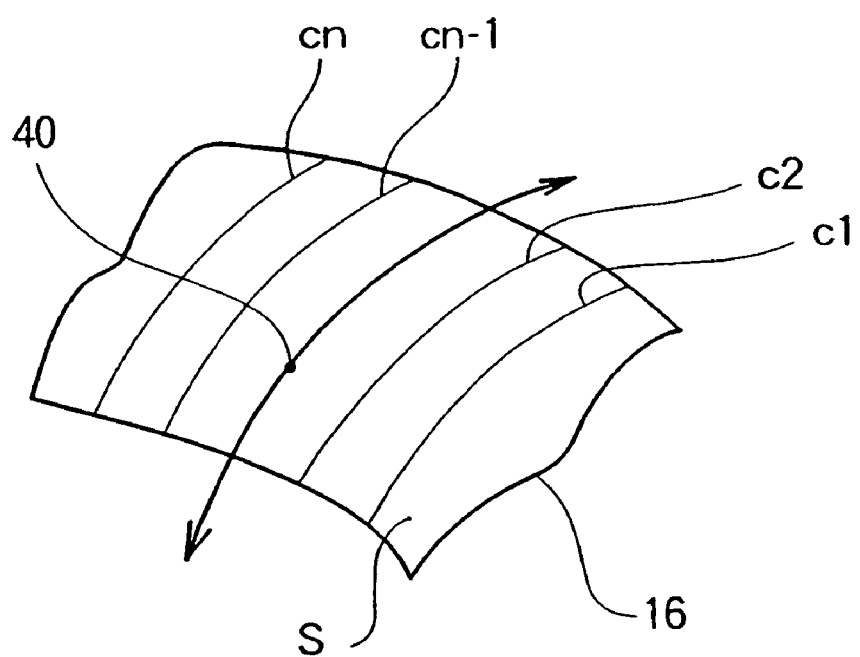
FIG. 20B is a view explanatory of a second phase of the mathematical approach.

Reference is made next to FIGS. 20A and 20B which are explanatory of a second phase of the mathematical approach. In FIG. 20A, assume that a normal-direction vector at point P on the curved surface S is called a normal vector n and that a plane including a normal vector n at a selected point P on the curved surface S and the first tangent vector X is called a normal section plane Hm. A point of intersection where the curved surface S and the normal section plane Hm meet draws a curve. The drawn curve is called c. In the inventive door window pane 16, all curvatures on the curve c are made to accord with the maximum curvature. As can be readily appreciated, there is an infinite number of curves c on the curved surface S. Thus, an infinite number of curves c are made to exist in accordance with rules described with reference to FIG. 20B.

Designated by reference numeral 40 in FIG. 20B is a sliding movement path followed by the window pane. In the inventive window pane 16, assume that an infinite number of curves is represented by cn, (n=1, 2, . . . , n). Then, all curves c1, c2, . . . , cn-1, cn are made to follow the sliding movement path 40 of the window pane.

One having a maximum curvature equal to a minimum curvature is a spherical surface. Because a spherical surface is irrelevant to the present invention, the maximum curvature is made not to accord with the minimum curvature. One having a minimum curvature of zero is a cylindrical surface. Again, since a cylindrical surface is irrelevant to the present invention, the minimum curvature is set to be other than zero.

As explained above in relation to FIGS. 19A, 19B, 20A and 20B, the present invention provides a vehicle window pane for slidable attachment to a motor vehicle, characterized in that the window pane comprises a curved pane having a substantially uniform thickness with a principal surface thereof forming a curved surface, the curved surface being an aggregate of points satisfying the conditions:

(a) when a vector contacting the curved surface at a point on the curved surface is called a tangent vector, a tangent vector having a maximum curvature is called a first tangent vector, and a tangent vector having a minimum curvature is called a second tangent vector, all points on the curved surface have the first tangent vector and the second tangent vector intersecting with each other orthogonally;

(b) when a normal-direction vector at a point on the curved surface is called a normal vector and a plane including the normal vector at a selected point on the curved surface and the first tangent vector is called a normal section plane, all curvatures on a curve formed at an intersection where the curved surface and a normal section plane meet accord with the maximum curvature;

(c) the curve formed at the intersection where the curved surface and the normal section plane meet follows a path of sliding movement of the window pane;

(d) the maximum curvature is not equal to the minimum curvature; and (e) the minimum curvature is not zero.

This makes it possible to precisely define the shape of the inventive window pane (bidirectionally curved pane). The thus produced vehicle window pane permits narrowing of the pocket opening 42 of FIG. 7, whereby the door body 31 can be made slim.

Figure 21:
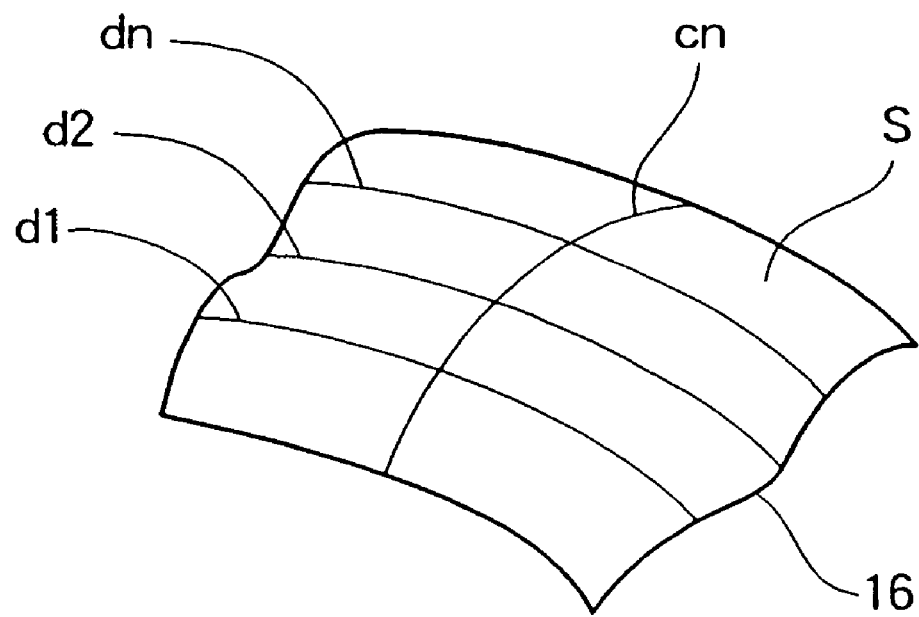
FIG. 21 is a view explanatory of additional features of the mathematical approach.

Referring now to FIG. 21, the second tangent vector (tangent vector $X_2$ of FIG. 19B) has a minimum curvature. Each curve dn (n=1, 2, . . . , n), which orthogonally intersects with a curve cn that can be regarded as an aggregate of first tangent vectors, is an aggregate of second tangent vectors. Herein, all curves dn (n=1, 2, . . . , n) are set to have a minimum curvature. Namely, the minimum curvature remains constant at all points on the curved surface. By arranging all the curves dn (n=1, 2, . . . , n) to have the same curvature, it becomes possible to simplify a mold for molding the window pane and hence to reduce the cost of mold production. When rolls are used for such molding, the shape of the rolls can be determined with ease.

Figure 22:
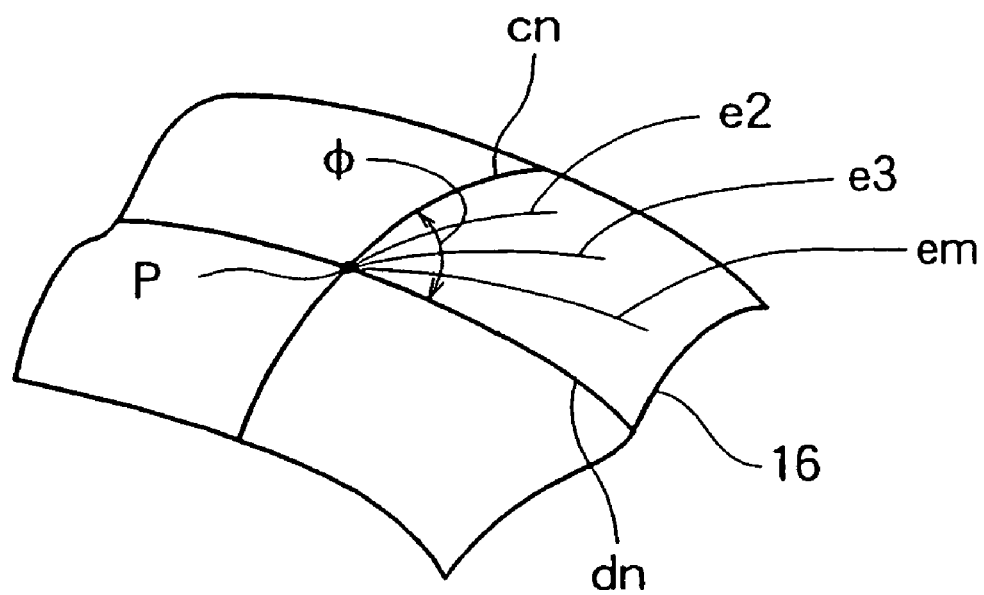
FIG. 22 is a view explanatory of additional features of the mathematical approach.
Figure 23:
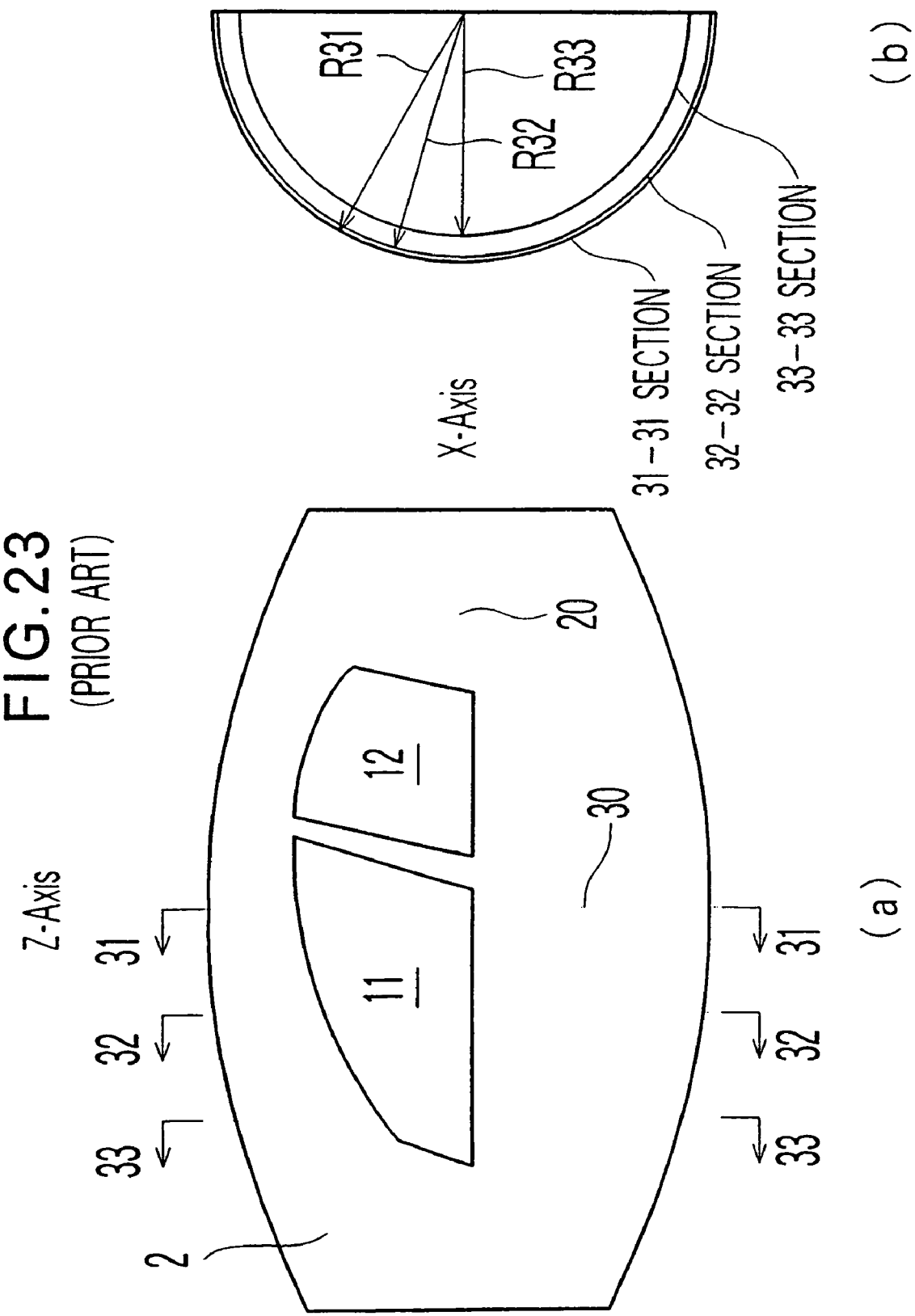
FIG. 23 is a view showing a conventional barrel-shaped window pane.

As shown in FIG. 22, an angular region or range $\phi$ is defined by and between a curve cn corresponding to the first tangent vector and a curve dn corresponding to the second tangent vector. Curvatures of curves em, (m=1, 2, . . . , n) extending within the angular range are arranged to vary continuously from the maximum curvature to the minimum curvature. At this time, since e1 lies over cn, 1 is not included in m.

The partially-poorly-shaped conventional window pane inherently includes or is likely to have, in a transition from the maximum radius of curvature R1 to the minimum radius of curvature R2, portions where radii of curvature suddenly vary. Those portions present problems of optical distortion and hence product quality deterioration. In contrast, by arranging curvatures extending within an angular range defined by and between the first and second tangent vectors to vary from the maximum curvature to the minimum curvature as in the present invention, a high-quality window pane (bidirectionally curved pane) can be provided which is free from optical problems.

It may be readily appreciated by skilled artisans that the inventive vehicle window pane may be applied to other than the side door windows of the motor vehicle, such as the roof window. Furthermore, the inventive window pane may also be applied to windows in trains, yachts, boats, ships, etc.

INDUSTRIAL APPLICABILITY

The present invention provides a curved window pane which can be used suitably as a vehicle window pane with superior advantages over the known cylindrically-curved, spherically-curved and barrel-shaped window panes and glass sheets with curves of compound curvature. The invention also provides a vehicle door structure incorporating such a curved window pane.

I claim:

1. A vehicle door structure, comprising a door body and a vehicle window pane slidably attached to the door body, said vehicle window pane having an accurately curved vertical section with a single radius of curvature that corresponds to a radius of curvature of a predetermined sliding movement path followed by said vehicle window pane, and a curved lateral section having a compound curvature composed of a continuous sequence of a plurality of radii of different curvature each different from the single radius of curvature in the curved vertical section, wherein said vertical section extends substantially the entire length of said window pane and extends parallel to the predetermined sliding movement path while said lateral section extends substantially the entire length of said window pane and intersects the predetermined sliding movement path substantially at right angles thereto.

2. The vehicle door structure as recited in claim 1 wherein said door body has an attachment space for slidably receiving said vehicle window pane therein and a pocket opening communicating with said attachment space for receiving said vehicle window pane with a substantially uniform clearance between an outer peripheral surface of said vehicle window pane and an inner surface of said door body defining said pocket opening; and further comprising:

a pair of guide rails disposed in said door body and having a radius of curvature substantially equal to said radius of curvature of the predetermined sliding movement path of said vehicle window pane, so as to guide said vehicle window pane in and out of said pocket opening; and a window regulator for sliding said vehicle window pane along said guide rails.

* * * * *